(12) United States Patent
Johnson et al.

(10) Patent No.: US 9,251,257 B2
(45) Date of Patent: Feb. 2, 2016

(54) DELETING A FILE ON READING OF THE FILE

(75) Inventors: Alexander C Johnson, Portland, OR (US); Badari Pulavarty, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 12/910,699

(22) Filed: Oct. 22, 2010

(65) Prior Publication Data

US 2012/0102004 A1    Apr. 26, 2012

(51) Int. Cl.
| | |
|---|---|
| G06F 17/30 | (2006.01) |
| H04N 21/47 | (2011.01) |
| H04N 21/472 | (2011.01) |
| G11B 27/034 | (2006.01) |
| G11B 27/10 | (2006.01) |

(52) U.S. Cl.
CPC ........ *G06F 17/30817* (2013.01); *G11B 27/034* (2013.01); *G11B 27/105* (2013.01); *H04N 21/472* (2013.01)

(58) Field of Classification Search
CPC ........... H04N 21/44213; H04N 21/472; G06F 17/30817
See application file for complete search history.

(56) References Cited

U.S. PATENT DOCUMENTS

| | | | |
|---|---|---|---|
| 5,813,008 A * | 9/1998 | Benson et al. | |
| 6,487,586 B2 * | 11/2002 | Ogilvie et al. | 709/206 |
| 7,203,700 B1 * | 4/2007 | Kumar et al. | |
| 7,496,607 B2 * | 2/2009 | Sollicito et al. | |
| 7,739,265 B2 | 6/2010 | Jain et al. | |
| 7,751,628 B1 * | 7/2010 | Reisman | 382/232 |
| 7,765,244 B2 | 7/2010 | Rajakarunanayake | |
| 7,769,792 B1 * | 8/2010 | Burrows et al. | 707/814 |
| 7,945,747 B2 * | 5/2011 | Kataoka et al. | 711/159 |
| 2004/0091239 A1 | 5/2004 | Poslinski et al. | |
| 2004/0267705 A1 * | 12/2004 | Lemus et al. | 707/3 |
| 2005/0185557 A1 * | 8/2005 | Inakura | 369/53.39 |
| 2005/0232610 A1 | 10/2005 | Boger et al. | |
| 2005/0240843 A1 | 10/2005 | Steinmann et al. | |
| 2006/0020627 A1 | 1/2006 | Poslinski | |
| 2007/0033232 A1 | 2/2007 | Malloy | |
| 2007/0269189 A1 | 11/2007 | Russ | |
| 2008/0076470 A1 | 3/2008 | Ueda et al. | |
| 2008/0098038 A1 | 4/2008 | Motoyama | |
| 2008/0172563 A1 | 7/2008 | Stokes | |

(Continued)

OTHER PUBLICATIONS

Klonowski et al., Data Deletion with Time-Aware Adversary Model, CSE International Conference, Aug. 29-31, 2009, 6 pages, vol. 2.

(Continued)

*Primary Examiner* — William Spieler
(74) *Attorney, Agent, or Firm* — Kunzler Law Group; Steven L. Bennett

(57) ABSTRACT

A digital file may be stored on a storage device and deleted upon reading of the file. In one example, at least a portion of the stored file may be read, such as by a processor. In response to the reading of the stored file, at least part of the at least a portion of the stored file that has been read may be deleted. In further examples, the at least part of the at least a portion of the stored file may be deleted progressively while the stored file is being read, after a triggering event, or after a delay in time. According to another example, a user may provide an indication representative of the at least part of the at least a portion of the stored file that is to be deleted after the at least a portion of the stored file is read.

19 Claims, 5 Drawing Sheets

(56) References Cited

U.S. PATENT DOCUMENTS

| | | | |
|---|---|---|---|
| 2008/0215666 A1* | 9/2008 | Kadota | 709/202 |
| 2009/0165036 A1* | 6/2009 | Berry | G06F 17/30817 725/32 |
| 2009/0300697 A1* | 12/2009 | Hielscher | H04N 5/76 725/114 |
| 2010/0070698 A1 | 3/2010 | Ungureanu et al. | |
| 2010/0086277 A1* | 4/2010 | Craner | 386/52 |
| 2010/0092160 A1* | 4/2010 | Bhogal et al. | 386/124 |
| 2010/0125588 A1 | 5/2010 | Mehra et al. | |
| 2010/0125714 A1 | 5/2010 | Mehra et al. | |
| 2010/0153665 A1 | 6/2010 | Todd et al. | |

OTHER PUBLICATIONS

Joukov et al., Adding Secure Deletion to Your Favorite File System, SISW Thrid IEEE International Conference, Dec. 13, 2005, 8 pages.

\* cited by examiner

DELETING A FILE ON READING OF THE FILE

BACKGROUND

The present invention relates to managing files, and more specifically, to automatic deletion of a file or part of the file in response to the reading of the file or portion of the file.

There are many applications in which digital files are stored for subsequent reading and use. Files may be deleted when they are no longer needed or there is a reason to delete the files, such as for privacy or security concerns. When they are deleted there is more storage space available for other files.

There are a number of consumer electronic devices available today that store large data files for reading by the user. Examples of such devices include digital video recorders (DVR), such as the Tivo™ recorder, wireless reading devices such as the Kindle™ e-book reader, and Blu-ray digital recorders. The data on these devices is stored as read only and is not meant to be modified. The amount of files that these devices can store is necessarily limited to the size of the stores on the devices. For example, some storage devices, such as a flash memory card or a rewritable DVD, can only store a limited number of hours of video files or "shows." Thus, the longer the shows, the fewer the number of shows a user can store. When storage devices are full, it is necessary to delete one or more stored files in order to make room for new files.

BRIEF SUMMARY

According to one embodiment of the present invention, a digital file may be stored on a storage device. At least a portion of the stored file may be read, such as by a processor. In response to the reading of the stored file, at least part of the at least a portion of the stored file that has been read may be deleted.

In a further example, the at least part of the at least a portion of the stored file may be deleted progressively while the stored file is being read. In another example, the at least part of the at least a portion of the stored file may be deleted after reading of the stored file has ended. According to another example, a user may provide an indication representative of the at least part of the at least a portion of the stored file that is to be deleted after the at least a portion of the stored file is read. Such an indication may be stored and may be associated with the file.

DETAILED DESCRIPTION

Figure 1:
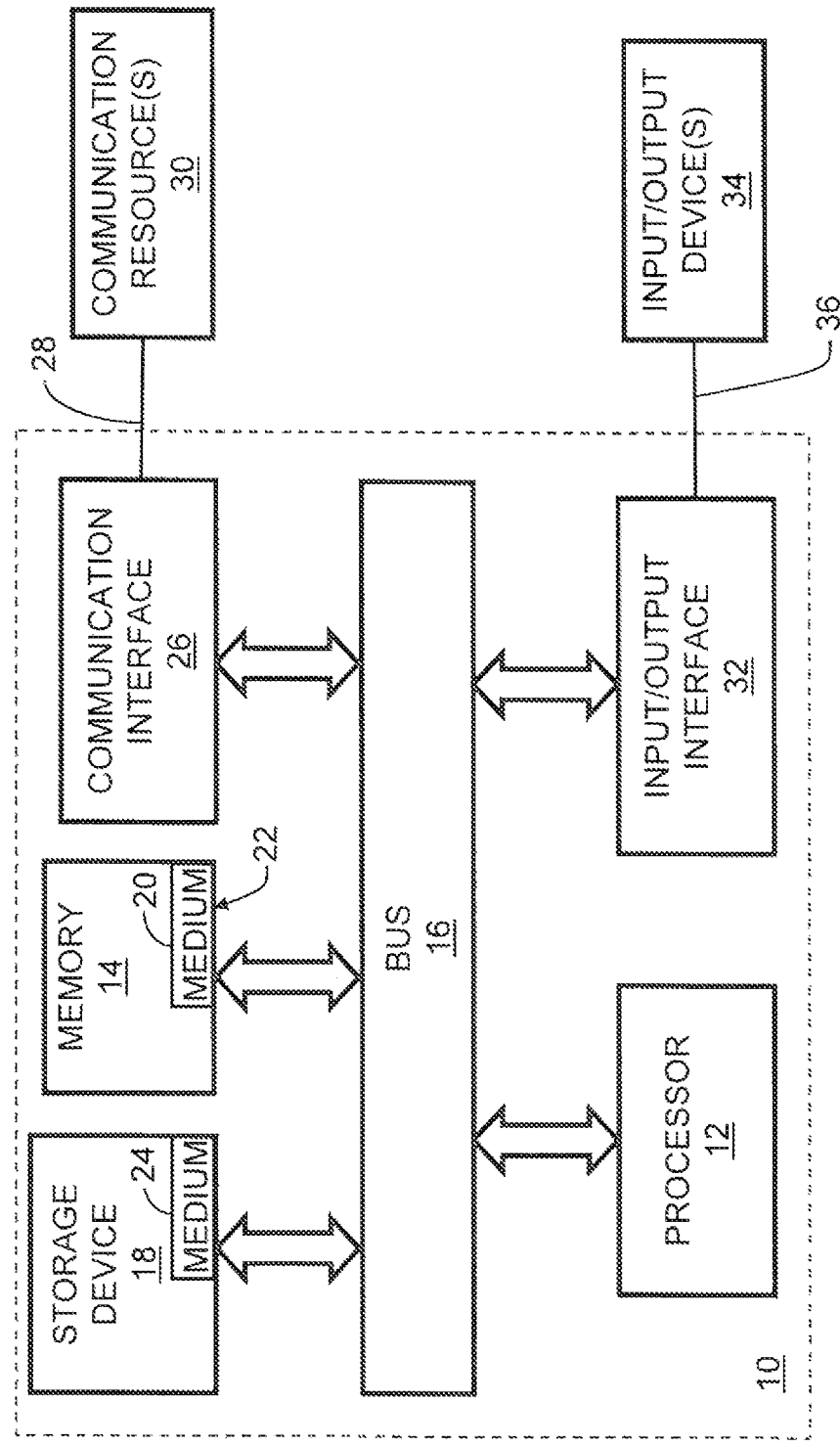
FIG. 1 depicts an exemplary data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit." "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be mitten in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following embodiments illustrate examples of deleting at least part of a file after at least a portion of the file is read. There may be various reasons for doing this, such as for making limited storage available for other uses, for deleting files that are not wanted after use, such as after reading the file, or for security or privacy concerns. This may be particularly useful in the case where large files or a large number of files are stored.

Referring now to FIG. 1, an exemplary data processing system 10 is shown in accordance with an embodiment of the invention. Data processing system 10 illustrates a general apparatus and other components may be added or illustrated components may be modified or removed. Data processing system 10 may be a general or special purpose computer such as a personal computer, a laptop computer, a computer cluster (e.g., a blade system), a web server, a database server, a smart phone, a wireless email device, a tablet computer, a personal digital assistant, a network component (e.g., firewall, router, switch), a video recorder, an audio recorder, and so forth. Data processing system 10 may include a central processing unit (CPU) or processor 12, a first storage device or memory 14 (e.g., one or a combination of RAM, RUM, hard drive, optical drive, cache memory) operatively coupled by a bus 16 to processor 12, and a second, long term storage device 18 (e.g., hard drive, optical drive). As discussed above, memory 14 may include a fixed or removable, solid-state or movable computer readable medium 20, such as a CD-ROM or flash drive, having computer executable instructions and/or data that may form in combination a computer program product shown generally at 22. Second storage device 18, operatively coupled to processor 12 via bus 16, may also include a fixed or removable computer readable medium 24 that may contain computer executable instructions and/or digital files and related data that may be stored, read, and deleted. For example where data processing system 10 is a personal or digital video recorder (PVR or DVR), medium 24 may be a low or high definition DVD.

Data processing system 10 may include additional components, such as one or more communication interfaces 26 through which a connection 28 may be established to communicate with appropriate communication resources 30. Communication interface 22, operatively coupled to processor 12 via bus 16, may take various forms, such as an Ethernet card, a wireless adapter, a cellular interface, and an analog or digital audio/video signal receiver or tuner. Communication resource 30 accordingly may be a suitable source of files, such as a data processing system or apparatus on a local or wide area network; a video or audio signal source such as a satellite or broadcast television receiver, a radio or tuner; a digital video disk player: a videotape player; a compact disk player; or an mp3 player.

As shown in FIG. 1, data processing system 10 may also include an input/output interface 32 operatively coupled to processor 12 via bus 16. Input/output interface 32 may provide communication between data processing system 10 and one or more input/output devices 34 via one or more connections 36. Input/output devices 34 may be any suitable devices appropriate for outputting and/or inputting information into data processing system 10. For example, input/output devices may include one or more of a keyboard, a mouse, a printer, a monitor or other display device such as a television, a remote control, a touch screen, a microphone, or a video camera.

Figure 2:
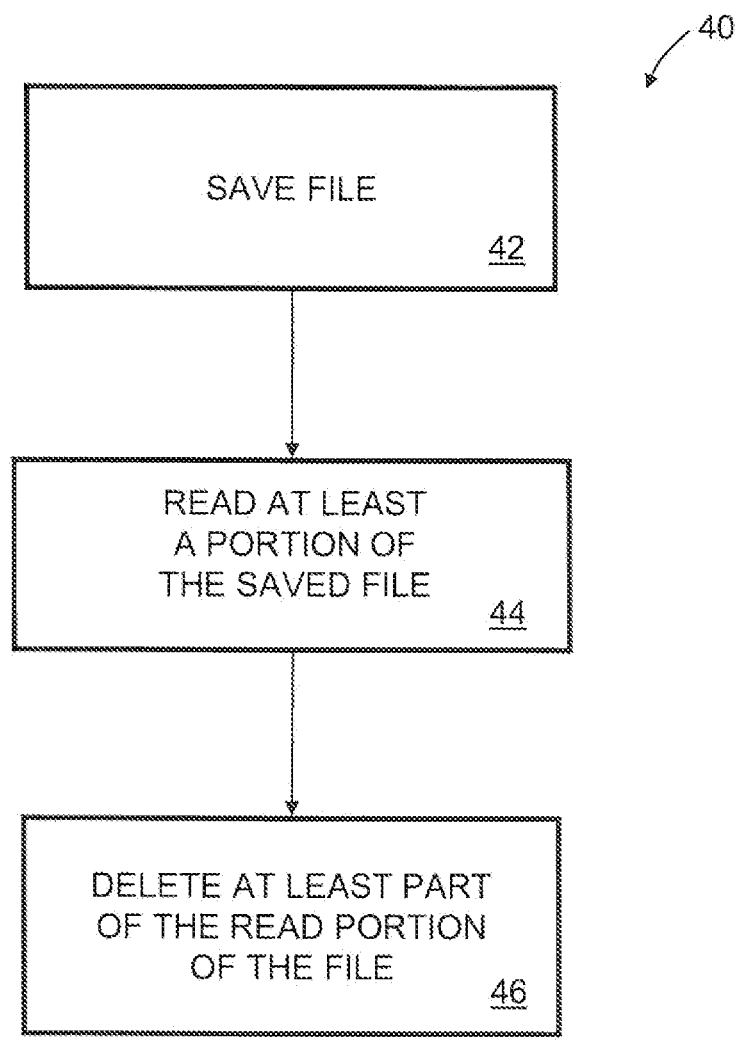
FIG. 2 depicts an exemplary method of saving, reading, and deleting at least part of a file.

Data processing system 10 may be configured to store, read and delete files. For example, as shown in FIG. 2, an exemplary method 40 is illustrated that may be embodied on data processing system 10. Method 40 may include saving a file at 42. For example, a signal received on communication interface 26 from a communication resource 30, such as a video and/or audio signal, email, or other file may be stored on storage device 18. At least a portion of the saved file may then be read at 44 by processor 12 from storage device 18, and output to an input/output device 34 via input/output interface 32. In response to the reading of the at least a portion of the stored file, at least part of the read portion of the file may be deleted at 46. In one example, all of the file is read, and in response to the reading of the file, the file is deleted. In another example, only a portion of the file is read. In response to the reading of the portion of the file, the read portion of the file may be deleted or part of the read portion of the file may be deleted.

Figure 3:
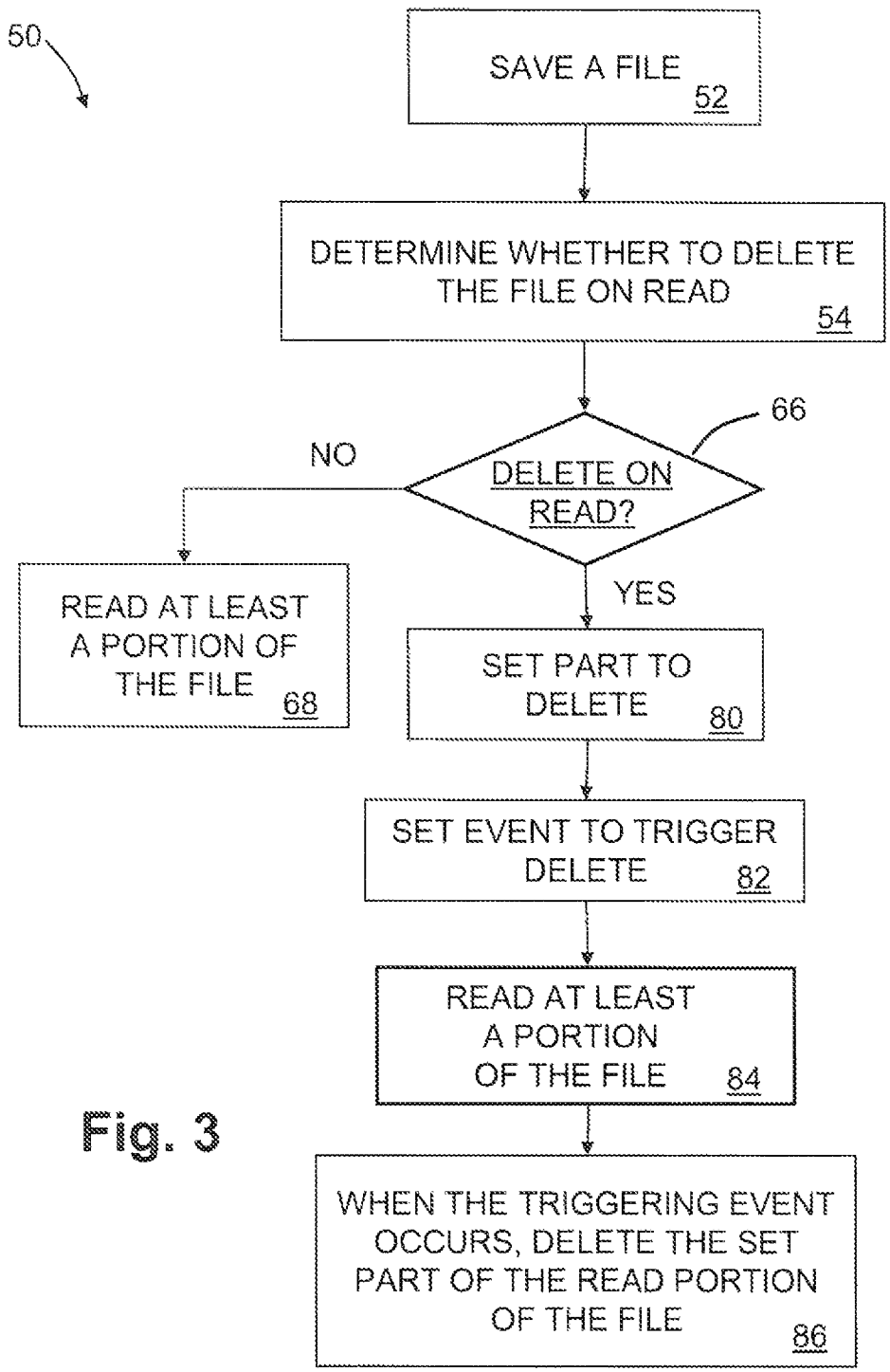
FIG. 3 depicts a further example of a method of saving, reading, and deleting at least part of a file.

FIG. 3 illustrates a further exemplary method 50 for deleting a file on reading of the file. Method 50 may include saving a file at 52. The file may have been received from a communication source 30, and may be saved on a suitable storage device, such as on storage medium 24 of storage device 18. A determination may be made at 54 before, after, or at the time of storing the file, as to whether to delete the file on reading of the file.

Figure 4:
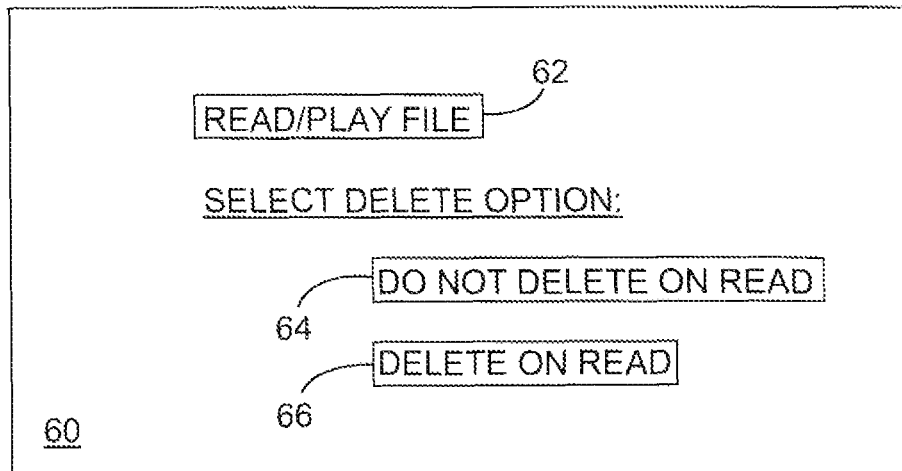
FIG. 4 depicts an exemplary display providing a user with a selectable delete-on-read option.

FIG. 4 illustrates an interactive display 60, such as may be displayed as a graphical user interface on a computer monitor or television screen, to provide a user the ability to select processing options related to the file when the user has selected the file or the file is otherwise identified. The display may include a selectable element 62 that is used to initiate the reading or playing of the file. The user may also be required to select a delete option. In this example, two options are shown, either of which may be selected by the user. One option, shown as a selectable element 64 stating "DO NOT DELETE ON READ," may be selected if the user wants to retain the file after it is read. A second option, shown as a selectable element 66 stating "DELETE ON READ," may be selected if the user wants to delete the file in response to the reading of the file. By selecting the "DELETE ON READ" option, the user submits to system 10, and processor 12 receives an indication from the user that at least a portion of the stored file is to be deleted after at least a portion of the stored file is read.

Returning to method 50, a determination may be made at 66 as to whether delete on read has been selected. If it has not been selected, then the file or a portion of it is read at 68, such as may occur under the control of the user during reading of a file, such as during viewing of a prerecorded video file, such as a television program or movie. Once the file or a portion of the file is read, the file is retained in full on the storage device. If delete-on-read has been selected, then in some examples, system 10 may be preconfigured to automatically delete all or part of the amount of a file that is read.

Figure 5:
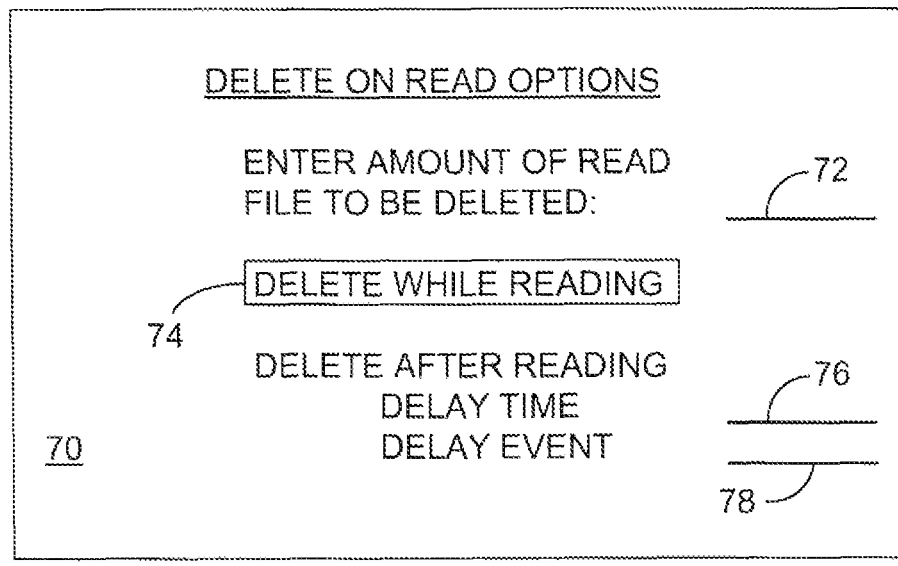
FIG. 5 depicts an exemplary display providing a user with selectable delete-on-read options.

In some examples, a user may be able to select parameters associated with the deleting of all or part of a file that is read. FIG. 5 illustrates an example of an interactive display 70 that is used by the system to receive from a user, parameter information controlling the deletion of files on the reading of the files. In this example, display 70 provides a list of delete-on-read options that a user might select. If options are not selected, there may be a set of predefined default parameters that control the delete-on-read process.

One parameter that the user may be instructed to input in a field 72 is the amount of a file to be deleted when it is read. A value appropriate to the application my be input. A drop-down menu may also be used to provide a selection of options available to the user. For example, the amount may be in terms of minutes or hours of reading time represented by the file, such as all of the read portion except the last five minutes read, or a percent of the portion of the file that is read if the entire file is not read. By deleting only part of the portion of a file that is read, the user is able to replay or re-read part of the read file immediately prior to the point in the file where reading ended to refresh her or his memory before reading unread portions of the file.

As an example, a user may view 80 percent of a saved four-hour show of a sporting event. If the user has indicated an option of having 90 percent of the read portion of a saved file deleted, then the part of the file that is deleted on reading of 80 percent of the file is 72 percent of the file. The last 8 percent of the read portion of the file is retained. This means that 2.88 hours of the file is deleted on reading 80 percent of the file, making this file space available for recording other video files.

A user may also be able to select a condition that must be met before the file or portion of the file is deleted. For example, a user may be able to select display element 74, "DELETE WHILE READING," to have the selected or indicated part of the read portion of the file deleted progressively (concurrently) as the file is being read. With this option, the deleting takes place while the file is being read.

A user may also or instead be able to indicate a later time to have the file deleted. The delay may be a delay period of time, or result from a later-occurring a triggering event that triggers the deletion operation. As shown in display 70, a field 76 may be used to indicate a delay time, such as hours or days after the file or a portion of the file is read, or after reading has ended. Also or instead, a field 78 may be used to indicate an appropriate triggering event. Examples of triggering events include when the current reading of the file ends, when reading the file ends and then is resumed, when system 10 is powered off and on again, or when a different file is read or stored. Again, drop-down menus may be used to provide the user with a set of predefined selectable options for these fields. The user may thus be able to submit to system 10 an indication that the at least part of at least a portion of the stored file that is read is to be deleted after the passage of an indicated period of time or the occurrence of an indicated triggering event.

Returning to FIG. 3 and method 50, when the user has selected the option of deleting the file or file portion on reading of the file, the part of the read portion is set at 80. This corresponds to entering in field 72 of display 70 an indication in the form of an amount of file to be deleted. An event may then be set at 82 that triggers deleting the file or file portion. This corresponds to the entering an event in field 78 of display 70. As indicated in display 70, method 50 may include more or fewer steps than those indicated. For example, the step of setting a delay period for deleting may be included instead of setting a triggering event.

Once parameters are input defining how delete-on-read is to be performed, the user may read at 84 at least a portion of the file. The parameters are then used to delete the file. If concurrent deleting is selected or is the default, then deleting occurs progressively while the reading occurs. If a delay time is set, then the selected part of the file is deleted after the delay time has passed. When a triggering event is used to trigger the file deletion, system 10 monitors the system to determine when the triggering event occurs. When the triggering event occurs, the indicated part of the file is deleted at 86, making that file space available for another file.

It is seen that a method, such as method 50, may provide an application or user with a mechanism for indicating to the system that designated blocks of the file that are read, such as read into the cache and used by the application are to be deleted. A mechanism then may be provided in the file system to selectively drop or delete the blocks of data that are read and served.

As has been described, applications or users may request this feature through an extension to existing application functionality, such as by using, for example, open( ) flag or call through madvise( ). This flag may indicate to the file system that contents of the disk blocks that are read from the file (into the cache) are to be deleted. When concurrent deleting while reading is used, as the application reads the data from the file, the file system deletes the block from the file to release the space back to the file system.

The delete-on-read feature may also be configurable to allow the user or application to determine how far back in the read file to delete or which portions of the file to delete, as determined by file structure. For example, it may be that the user or application selects keeping at least one data block of history, or keeping the beginning data block and the final read data block.

The system may also be configured to allow a user to select a range of blocks to be deleted once they have been read. Contents of a file can be viewed as set of logical blocks. As a simple example, for a given file that has blocks a, b, c, d, e, f, g, using the methods described, file blocks may be deleted as or after they are read by the application. System 10 may also be configured to delete some but not all blocks that are read, according to the block content, thereby releasing the disk space occupied by those blocks. For example, a user can request to delete blocks b, c and f. The retained blocks of the given file are then blocks a, d, e, and g. The selection parameters may be customized to the particular files and/or application.

Figure 6:
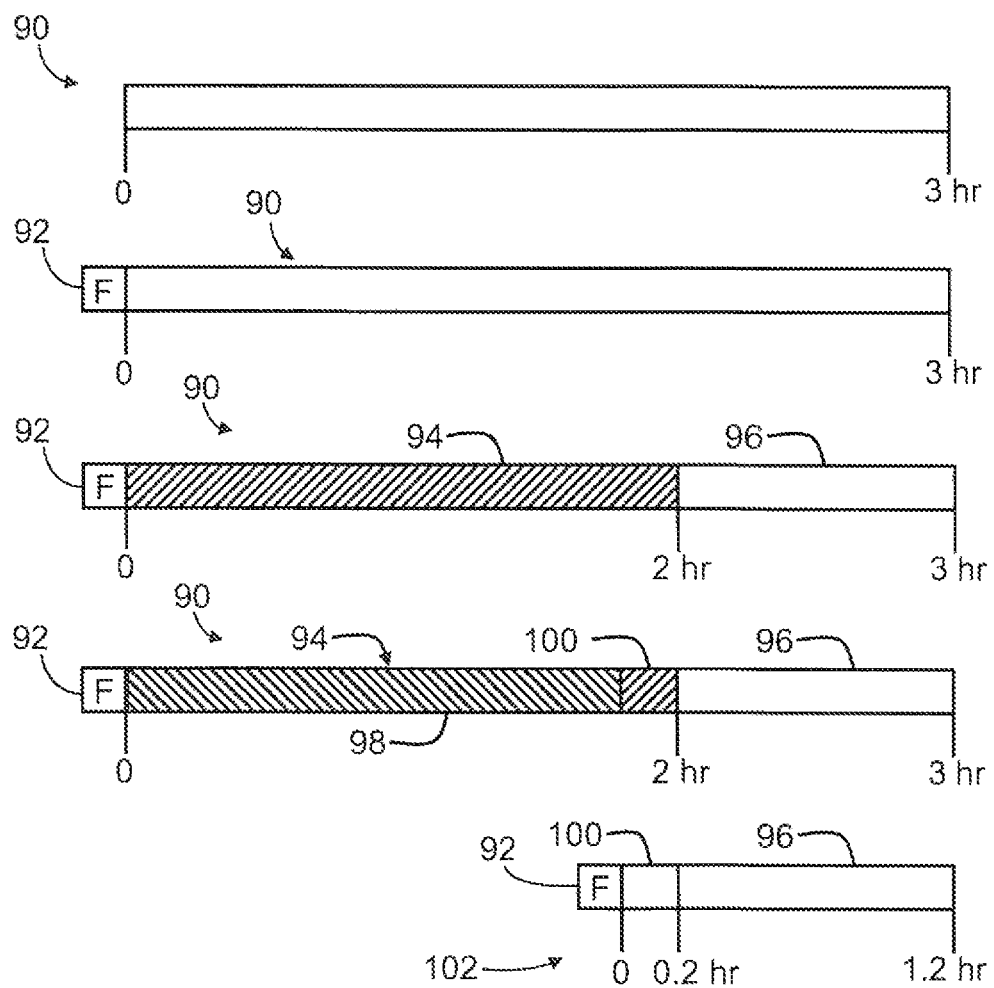
FIG. 6 depicts exemplary stages of saving, reading, and deleting a part of a file stored on a storage device.

FIG. 6 illustrates an example of a file in different stages of a file that is deleted on reading of a portion of the file. Shown is a first media or other digital file 90 stored by processor 12 on storage device 18. In this example, file 90 is an audio-video file having a size corresponding to a total viewing duration of 3 hours. A user submits indications to system 10 of one or more parameters relating to deleting part of the file upon reading of the file. These indications are represented generally by a flag 92 that is stored and associated with file 90. In this instance, the user selected the option of deleting 90 percent of the read file, with deletion occurring at a selected time, such as after a triggering event occurs or after a period of time.

During an initial read session, the equivalent of 2 hours of the file is read and viewed by the user, at which time the reading of the file ends. At this point, the file includes a read portion 94 having a duration of 2 hours and an unread portion 96 having a duration of 1 hour. After satisfaction of any set precondition for deleting part of read portion 94 of file 90, a part 98 that is 90 percent of read portion 94 is deleted, leaving a retained read portion 100 having a duration of 0.2 hour. After completion of the partial deletion, a reduced file 102 having a duration of 1.2 hours remains that includes unread file portion 96 and retained read file portion 100. Flag 92 continues to be associated with reduced file 102. It is thus, seen in this example that after the partial reading of file 90, the equivalent of 1.8 hours of file space is available for recording a new file. When reduced file 102 is in turn read, then the process is repeated. A default rule may apply when the entire file has been read, which rule may provide that the entire file is deleted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this, specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    storing a digital file on a non-volatile storage device;
    executing an extension for an application associated with the digital file stored on the non-volatile storage device, the extension being requested by a user and executed by the application using one or more of an open() flag and a an madvise() function call, the extension configured to:
        instruct a user to provide input for an amount of the at least a portion of the stored file to be deleted and a triggering event before the at least a portion of the stored file is deleted, the input for the amount of the at least a portion of the stored file to be deleted comprising a percentage of a read portion of the stored file, the percentage of the read portion of the stored file being less than a total amount of the read portion of the stored file, the triggering event selected from the group consisting of: ending a current reading of the stored file and then resuming reading of the file, reading an additional digital file different from the stored digital file after reading the stored digital file, storing an additional digital file different from the stored digital file after reading the stored digital file, and determining that a system comprising the processor has powered off then powered on again, wherein the user selects the percentage of the read portion of the stored file to be deleted and the triggering event from a list of predefined percentages and triggering events presented to the user;
        receive, from the user, input for an amount of the at least a portion of the stored file to be deleted and a triggering event before the at least a portion of the stored file is deleted;
        read with a processor at least a portion of the stored file, in response to receiving the input;
        monitor for the triggering event; and
        in response to the reading of the stored file and detecting the triggering event, one of (1) delete, from the storage device, only the user-inputted amount of the at least a portion of the stored file that has been read and (2) delete, from the storage device, at least part of the at least a portion of the stored file that has been read after a user-inputted delay period.

2. The method according to claim 1, further comprising receiving, from the user, input for a delay period before the at least part of the at least a portion of the stored file is deleted.

3. The method according to claim 1, wherein reading at least a portion of the stored file includes reading only a portion of the stored file.

4. The method according to claim 1, wherein the stored file comprises a set of data blocks, reading at least a portion of the stored file comprises reading one or more data blocks from the set of data blocks, and receiving input for an amount of the at least a portion of the stored file to be deleted comprises receiving a selection of a range of read data blocks to be deleted.

5. The method according to claim 1, wherein reading with a processor at least a portion of the stored file comprises loading the at least a portion of the stored file into a cache memory, the cache memory being separate from the storage device, and deleting only the user-inputted amount of the at least a portion of the stored file comprises deleting from the storage device the user-inputted amount of the at least a portion of the stored file read into the cache memory.

6. The method according to claim 1, further comprising:
determining whether all of the stored file is read; and
deleting all of the stored file in response to detecting the triggering event and all of the stored file being read.

7. The method according to claim 1, further comprising a flag that indicates that data blocks that have been read into a cache for the non-volatile storage device are to be deleted.

8. A system comprising:
a processor;
a memory operatively coupled to the processor; and
a non-volatile storage device operatively coupled to the processor and storing a digital file,
the memory storing instructions that are executed by the processor to:
execute an extension for an application associated with the digital file stored on the non-volatile storage device, the extension being requested by a user and executed by the application using one or more of an open() flag and a an madvise() function call, the extension configured to:
instruct a user to provide input for at least one of (1) an amount of the at least a portion of stored file to be deleted, the input for the amount of the at least a portion of the stored file to be deleted comprising a percentage of a read portion of the stored file, the percentage of the read portion of the stored file being less than a total amount of the read portion of the stored file, and (2) triggering event before the at least a portion of the stored file is deleted, the triggering event selected from the group consisting of:
ending a current reading of the stored file and then resuming reading of the file, reading an additional digital file different from the stored digital file after reading the stored digital file, storing an additional digital file different from the stored digital file after reading the stored digital file, and determining that a system comprising the processor has powered off then powered on again, wherein the user selects the percentage of the read portion of the stored file to be deleted and the triggering event from a list of predefined percentages and triggering events presented to the user;
receive, from the user, input for at least one of (1) an amount of the at least a portion of the stored file to be deleted and (2) a triggering event before the at least a portion of the stored file is deleted;
read at least a portion of the stored file, in response to receiving the input;
monitor for the triggering event; and
in response to the reading of the stored file and detecting the triggering event, one of (1) delete only the user-inputted amount of the at least a portion of the stored file that has been read and (2) delete at least part of the at least a portion of the stored file that has been read after a user-inputted delay period.

9. The system according to claim 8, wherein the memory further stores instructions that are executed by the processor to receive, from the user, input for a delay period before the at least part of the at least a portion of the stored file is deleted.

10. The system according to claim 8, wherein the stored file comprises a set of data blocks, the instructions to read at least a portion of the stored file comprise instructions to read one or more data blocks from the set of data blocks, and the instructions to receive input for an amount of the at least a portion of the stored file to be deleted comprises instructions to receive a selection of a range of read data blocks to be deleted.

11. The system according to claim 8, further comprising:
a cache memory operatively coupled to the processor and separate from the storage device, wherein the instructions to read least a portion of the stored file comprises instructions to read the at least a portion of the stored file into the cache memory and the instructions to delete only the user-inputted amount of the at least a portion of the stored file that has been read comprises instructions to delete from the storage device the user-inputted amount of the at least a portion of the stored file read into the cache memory.

12. The system according to claim 8, wherein the memory further stores instructions that are executed by the processor to:
determine whether all of the stored file is read; and
delete all of the stored file in response to detecting the triggering event and all of the stored file being read.

13. The system according to claim 8, further comprising a flag that indicates that data blocks that have been read into a cache for the non-volatile storage device are to be deleted.

14. A computer program product for deleting file content, the computer program product including a plurality of computer executable instructions stored on a non-transitory computer readable storage medium, wherein the instructions are executed by a computer to:
store a digital file on a non-volatile storage device; and
execute an extension for an application associated with the digital file stored on the non-volatile storage device, the extension being requested by a user and executed by the application using one or more of an open() flag and a an madvise() function call, the extension configured to:
instruct a user to provide input for at least one of (1) an amount of the at least a portion of stored file to be deleted, the input for the amount of the at least a portion of the stored file to be deleted comprising a percentage of a read portion of the stored file, the percentage of the read portion of the stored file being less than a total amount of the read portion of the stored file, and (2) a triggering event before the at least a portion of the stored file is deleted, the triggering event selected from the group consisting of: ending a current reading of the stored file and then resuming reading of the file, reading an additional digital file different from the stored digital file after reading the stored digital file, storing an additional digital file different from the stored digital file after reading the stored digital file, and determining that a system comprising the processor has powered off then powered on again, wherein the user selects the percentage of the read portion of the stored file to be deleted and the triggering event from a list of predefined percentages and triggering events presented to the user;
receive, from the user, input for at least one of (1) an amount of the at least a portion of the stored file to be deleted and (2) a triggering event before the at least a portion of the stored file is deleted;
read at least a portion of the stored file, in response to receiving the input;
monitor for the triggering event; and
in response to the reading of the stored file and detecting the triggering event, one of (1) delete only the user-inputted amount of the at least a portion of the stored file that has been read and (2) delete at least part of the at least a portion of the stored file that has been read after a user-inputted delay period.

15. The computer program product of claim 14, wherein the computer executable instructions are further configured to receive, from the user, input for a delay period before the at least part of the at least a portion of the stored file is deleted.

16. The computer program product of claim 14, wherein the stored file comprises a set of data blocks, the instructions to read at least a portion of the stored file comprise instructions to read one or more data blocks from the set of data blocks, and the instructions to receive input for an amount of the at least a portion of the stored file to be deleted comprises instructions to receive a selection of a range of read data blocks to be deleted.

17. The computer program product of claim 14, wherein the instructions to read least a portion of the stored file comprises instructions to load the at least a portion of the stored file into a cache memory, the cache memory being separate from the storage device, and the instructions to delete only the user-inputted amount of the at least a portion of the stored file that has been read comprises instructions to delete from the storage device the user-inputted amount of the at least a portion of the stored file read into the cache memory.

18. The computer program product of claim 14, wherein the computer executable instructions are further configured to:
   determine whether all of the stored file is read; and
   delete all of the stored file in response to detecting the triggering event and all of the stored file being read.

19. The computer program product of claim 14, further comprising a flag that indicates that data blocks that have been read into a cache for the non-volatile storage device are to be deleted.

* * * * *